Evin L. Cook
INVENTOR.

BY Frederick E. Dumoulin
ATTORNEY

Patented Oct. 12, 1954

2,691,298

UNITED STATES PATENT OFFICE 2,691,298

FILTER CAKE THICKNESS GAUGE

Evin L. Cook, Dallas, Tex., assignor, by mesne assignments, to Socony-Vacuum Oil Company, Incorporated, New York, N. Y., a corporation of New York Application November 3, 1951, Serial No. 254,675

5 Claims. (Cl. 73—61)

This invention relates to measuring instruments and more particularly to an instrument for the measurement of the thickness of filter cakes.

During the drilling of oil and gas wells, drilling fluids, composed, for example, of water or oil or an emulsion of water and oil and a solid such as clay, are circulated in the bore hole to aid in cooling the bit, to carry cuttings to the surface, to provide a static pressure head to prevent gas from passing from the formation into the bore hole, and to form a wall or mud cake on the sides of the bore hole to prevent excessive water losses into the formation which would adversely affect subsequent production of the well. The extent to which the drilling fluids perform this latter function of preventing excessive water losses is dependent, in part, upon the permeability of the mud cake thus formed. This permeability, a property of the mud cake, may be estimated from the thickness of a filter cake formed during a standard water loss test along with other information which may be obtained from such test. In order to obtain a representative sample of the mud cake which might be formed within a well bore, the standard water loss test is run by passing the drilling fluid through a standard filtration cell or wall builder under a standard pressure for a given period of time. It has been prior practice to remove the mud cake, or filter cake as it is sometimes called, from the filtration cell, and, after washing, measure its thickness by inserting a ruler into the cake to the bottom thereof and observing the depth of the penetration of the ruler. This procedure is unsatisfactory as the filter cake is often partly washed away, thus giving an inaccurate reading, and the insertion of the ruler tends to deform the filter cake at the point where the reading is taken. Also, with filter cakes of low permeability a film of wash water remains on the cake forming a meniscus around the ruler and consequently giving a deceptive reading. In the case of very thin cakes, this meniscus may be as thick as or thicker than the filter cake itself.

It is an object of my invention to provide an instrument which will measure filter cake thickness without removal of the filter cake from the filtration cell.

Another object of my invention is to avoid errors in measuring filter cake thickness that arise by deformation of the filter cake and by the formation of a meniscus on the filter cake.

Another object of my invention is to eliminate the washing of the filter cake.

Further objects of my invention will become apparent from a reading of the following specification and by reference to the accompanying drawings in which.

Figure 1:
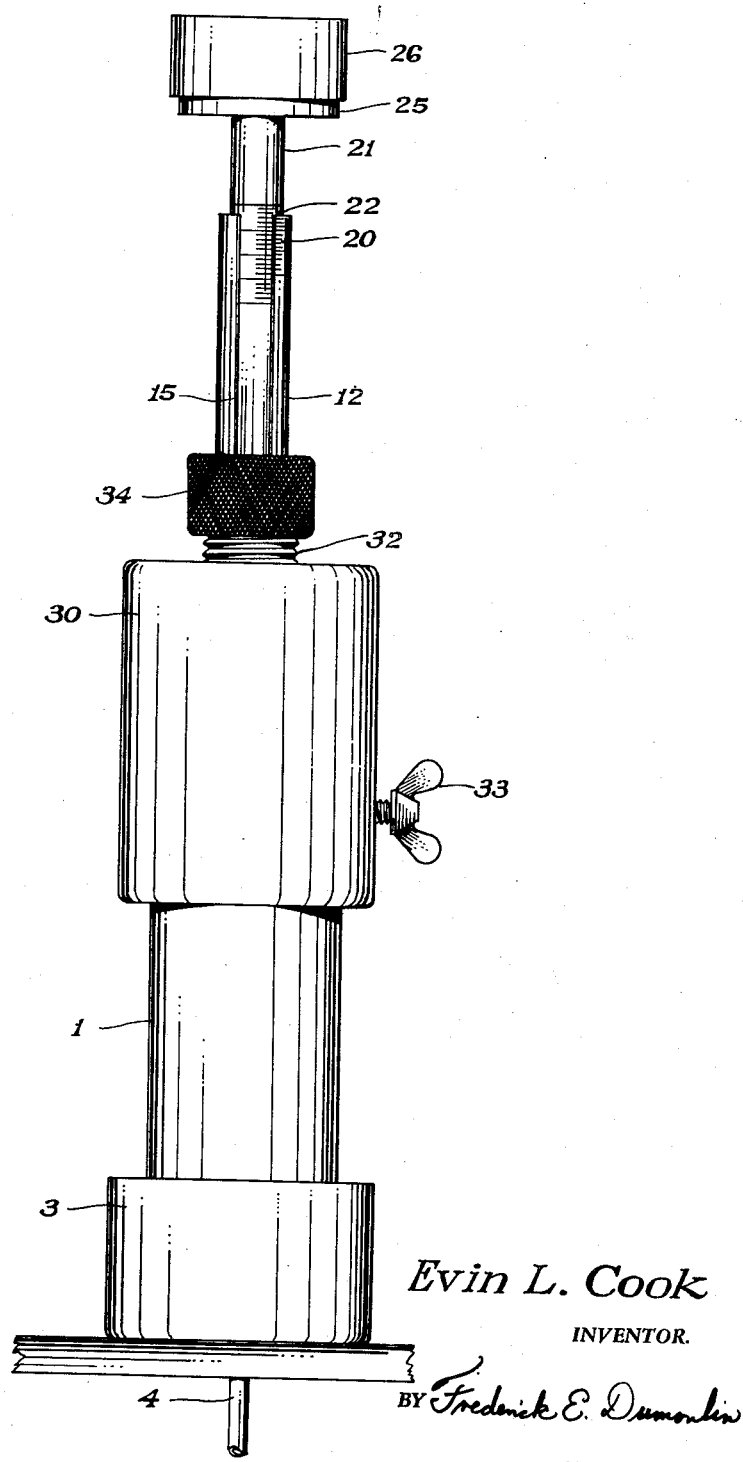
Fig. 1 is a side elevation of a preferred design of an instrument constructed in accordance with the invention.
Figures 2, 3:
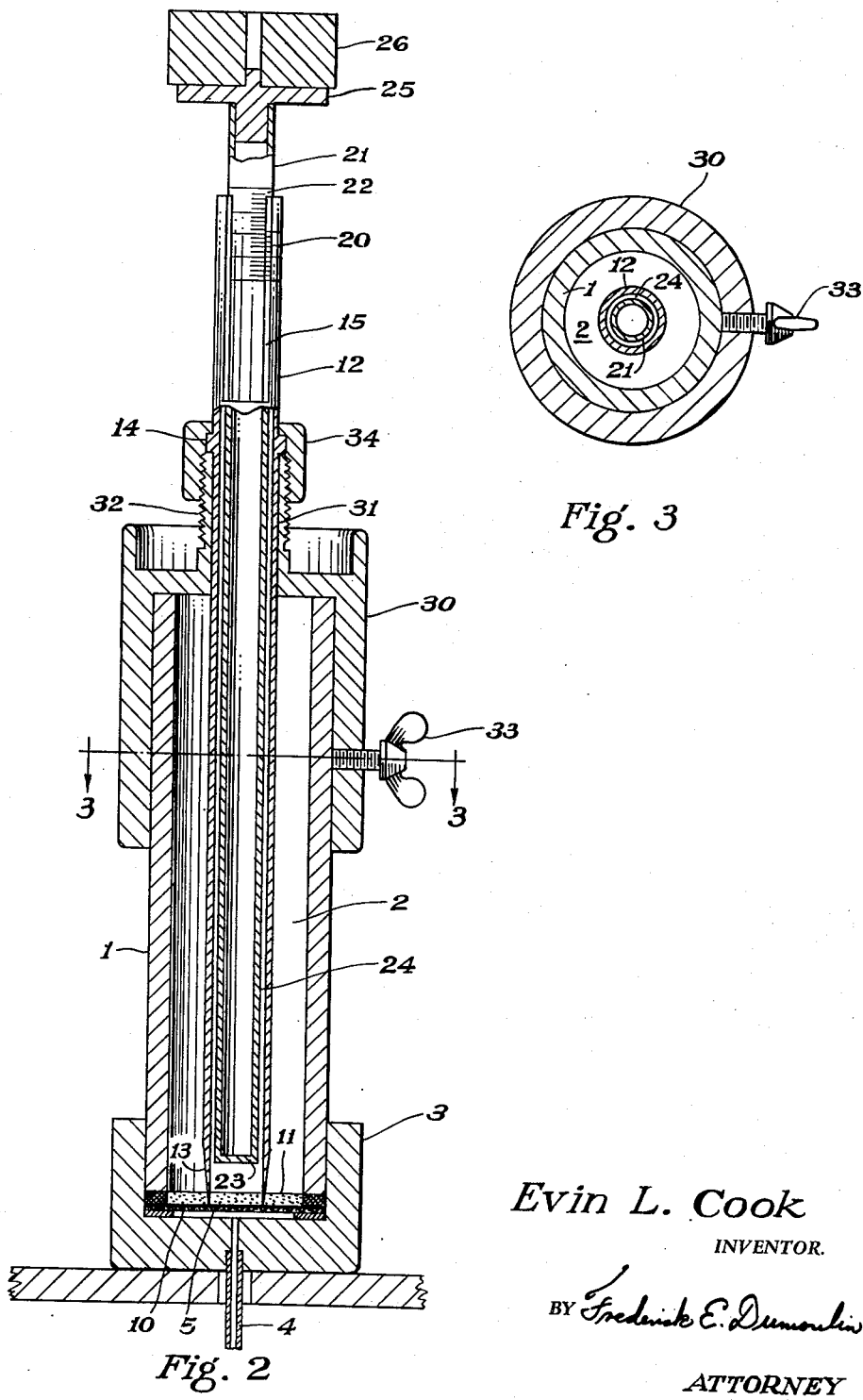
Fig. 2 is a cross-section along a longitudinal axis of the instrument of Fig. 1.
Fig. 3 is a cross-section along the line 3—3 of Fig. 2.

Filtration cell container 1 is bored to form chamber 2 which is closed at its lower end by base 3 containing drain hole 4. Positioned within and at the bottom of chamber 2 are screen 5 and filter paper 10 resting on base 3. During a water loss test, filter cake 11 is formed on filter paper 10.

In accordance with my invention, I provide, to operate in conjunction with the above described apparatus, cylinder 12 which is provided with tapered end 13, shoulder 14, longitudinal opening 15, and longitudinally graduated scale 20, which may be a vernier scale. Piston 21, provided with longitudinally graduated scale 22 and mud contacting surface 23, perpendicular to the longitudinal axis of the piston 21, is positioned within the bore of cylinder 12 in such spaced relation that annulus 24 is formed between the outer surface of piston 21 and the inner surface of cylinder 12. Graduated scale 20 and graduated scale 22 are so positioned on cylinder 12 and piston 21, respectively, that their zero points will coincide when the mud contacting surface 23 of piston 21 is even with the edge of tapered end 13 of cylinder 12. Piston 21 is capped with removable top 25 to provide a base for weight 26, the top and weight fitting such that they may be put on or taken off piston 21 easily.

Head 30, positioned over container 1 and forming a closure for the upper end of chamber 2, is provided with inner bore 21 and outer screw threads 32, the head 30 being held in place by set screw 33. Cylinder 12 is positioned within bore 31 of head 30, such that tapered end 13 will rest on filter paper 10, but will not cut through it, and is secured in place by internally screw threaded cap 34 which engages shoulder 14.

To form a sample filter cake of the drilling fluid in question, a standard water loss test is run in the filtration cell. To run the test, chamber 2 is filled with the drilling fluid and a given pressure is exerted on the fluid for a given period of time, the pressure and time depending upon the mud being tested. The liquid base of the drilling fluid is forced through filter paper 10 and screen 5 out through drain hole 4, the solid matter suspended in the drilling fluid settling on filter paper 10 forming filter cake 11 whose thickness may be measured with the instrument of my invention. At the completion of the water loss test, a substantial portion of the drilling fluid will remain in chamber 2 and in accordance with my invention may be left there during the measurement of the filter cake thickness.

To assemble the instrument on the filtration cell, head 30 is placed on container 1 and secured by set screw 33. Cylinder 12 is inserted into bore 31 until end 13 has pierced filter cake 11 and is resting on filter paper 10, and the cylinder 12 then is secured in place by cap 34 to insure proper contact between end 13 and filter paper 10. Piston 21 is inserted into the cylinder 12, and top 25 and weight 26 are placed in position on top of the position.

Tapered end 13 is formed on cylinder 12 by cutting the cylinder from its outer surface to a substantial knife edge so that when the end passes through the filter cake that portion of the cake displaced by the end will be pushed outwardly from the end and that portion enclosed by the end will retain its shape and thickness, thus preventing the inaccuracies inherent in the prior practice due to the deformation of the filter cake around the ruler used in measuring its thickness.

Weight 26 is used to give piston 21 a rate of descent which will allow easy reading of the relative position of piston 21 during descent. For example, a period of one to several minutes may be chosen to give the operator sufficient time to take several readings during descent. Therefore, the value of weight 26 is dependent upon the viscosity of mud being tested and the rate of descent desired by the operator of my instrument. However, weight 26 must not be so heavy that it will depress the interface of the filter cake, which would result in an inaccurate reading of the thickness of the filter cake. It is preferred to have several weights of different values to provide for testing of a variety of drilling fluids. Also, it will be apparent that the external diameter of piston 21 in addition to the value of weight 26 may be varied to give desirable rates of descent in drilling fluids of various viscosities.

To take the thickness measurement in muds where the interface is well defined, piston 21 is allowed to sink slowly through the fluid encased in cylinder 12 until the head of the piston comes to rest on the top surface of the interface of the filter cake 11, the displaced drilling fluid within cylinder 12 flowing up through annulus 24 and out through opening 15. When the head of the piston is at rest, a reading of scale 22 in cooperation with scale 20 shows the position of piston 21 relative to filter paper 10, which reading is the thickness of the filter cake being measured. In drilling fluids where the interface of the filter cake is very poorly defined, the head of piston 21 will slightly depress the interface of the filter cake giving an inaccurate reading. Therefore, when testing this type of drilling fluid it is preferred to use the "rate of fall" method of operating my invention. The piston 21 is allowed to drop downward, as before described, but readings are taken at predetermined intervals during its descent until the head of the piston comes to rest. These readings are plotted on a graph on which one ordinate shows the position of the head of cylinder 12 relative to filter paper 10 and the other ordinate shows the time interval between readings. The deflection or break point of the plotted curve will show the thickness of the filter cake.

Though the above description of my invention is written in terms of its use on filter cakes formed by drilling fluids, it is to be understood that my invention may be used to measure the thickness of any filter cakes and is to be limited only by the scope of the appended claims.

I claim:

1. In an instrument for measuring filter cake thickness the combination of a head adapted to receive a filtration cell and having a longitudinal bore therein, a cylinder positioned within said bore in said head, said cylinder being tapered from its outer surface inwardly to form a sharp cutting edge at one end and having a longitudinal cut out portion at the other end forming an opening therein, a longitudinal vernier scale on said cylinder adjacent said opening, a piston positioned within said cylinder and having an outer diameter sufficiently less than the inner diameter of said cylinder to allow the passage of liquid between the outer surface of said piston and the inner surface of said cylinder, a longitudinal graduated scale on said piston adjacent to one end thereof to cooperate with said vernier scale on said cylinder, and a weight fitted on said piston at the end thereof adjacent to said graduated scale.

2. In an instrument for measuring filter cake thickness the combination of a head adapted to receive a filtration cell and having a longitudinal bore therein, a cylinder positioned within said bore in said head, said cylinder being tapered from its outer surface inwardly to form a sharp cutting edge at one end and having a longitudinal cut out portion at the other end forming an opening therein, a longitudinal vernier scale on said cylinder adjacent said opening, means for securing said cylinder within said bore of said head, a portion positioned within said cylinder and having an outer diameter sufficiently less than the inner diameter of said cylinder to allow the passage of liquid between the outer surface of said piston and the inner surface of said cylinder, a longitudinal graduated scale on said piston adjacent to one end thereof to cooperate with said vernier scale on said cylinder, a top fitted on said piston at the end thereof adjacent to said graduated scale, and a weight fitted to said top.

3. In a filtration cell having a container wherein a filter cake is formed therein at the bottom surface thereof by filtration of a liquid slurry from said container, means for measuring the thickness of said filter cake comprising a cylinder positioned longitudinally within said container, said cylinder being tapered from its outer surface inwardly to form a sharp cutting edge at the bottom end thereof and having a longitudinal cut out portion at the upper end forming an opening therein, a graduated scale adjacent said opening in said cylinder, and a piston slidable in said cylinder having a longitudinal graduated scale to cooperate with said scale on said cylinder, said piston having a diameter sufficiently less than the internal diameter of the cylinder as to form an annulus between said piston and said cylinder.

4. In a filtration cell having a container wherein a filter cake is formed therein at the bottom surface thereof by filtration of a liquid slurry from said container, means for measuring the thickness of said filter cake comprising a head fitting over the top of said container and having a longitudinal bore therein, a cylinder positioned within said container and passing through said bore in said head, said cylinder being tapered from its outer surface inwardly to form a sharp cutting edge at the bottom end thereof and having a longitudinal cut out portion at the top end forming an opening therein, a longitudinal graduated scale on said cylinder adjacent said opening, a piston positioned within said cylinder and having an outer diameter sufficiently less than the inner diameter of said cylinder to allow the passage of liquid slurry between the outer surface of said piston and the inner surface of said cylinder, a longitudinal graduated scale on said piston adjacent to the top end thereof to cooperate with said graduated scale on said cylinder, and a weight fitted on said piston at the top end thereof.

5. In a filtration cell having a container wherein a filter cake is formed therein at the bottom surface thereof by filtration of a liquid slurry from said container, means for measuring the thickness of said filter cake comprising a head fitting over the top of said container and having a longitudinal bore therein, a cylinder positioned within said container and passing through said bore in said head, said cylinder being tapered from its outer surface inwardly to form a sharp cutting edge at the bottom end thereof and having a longitudinal cut out portion at the top end thereof forming an opening therein, a longitudinal graduated vernier scale on said cylinder adjacent said opening, a piston positioned within said cylinder and having an outer diameter sufficiently less than the inner diameter of said cylinder to allow the passage of liquid slurry between the outer surface of said piston and the inner surface of said cylinder, a longitudinal graduated scale on said piston adjacent to the upper end thereof to cooperate with said graduated vernier scale on said cylinder, a top forming a platform fitted on said piston at the upper end thereof, and a weight fitted to said top.

References Cited in the file of this patent

UNITED STATES PATENTS

| Number | Name | Date |
|---|---|---|
| 490,860 | Snoeck | Jan. 31, 1893 |
| 2,346,945 | Samson et al. | Apr. 18, 1944 |

FOREIGN PATENTS

| Number | Country | Date |
|---|---|---|
| 43,561 | France | Apr. 23, 1934 |